US008764429B1

(12) United States Patent
Voyatzakis et al.

(10) Patent No.: US 8,764,429 B1
(45) Date of Patent: Jul. 1, 2014

(54) DOUGH ROUNDER WITH TEXTURED AUGER

(71) Applicant: Somerset Industries, Inc., North Billerica, MA (US)

(72) Inventors: Andrew D. Voyatzakis, Carlisle, MA (US); George Athanasiadis, Lexington, MA (US)

(73) Assignee: Somerset Industries, Inc., N. Billerica, MA (US)

( * ) Notice: Subject to any disclaimer, the term of this patent is extended or adjusted under 35 U.S.C. 154(b) by 0 days.

(21) Appl. No.: 13/760,336

(22) Filed: Feb. 6, 2013

(51) Int. Cl.
*A21C 1/14* (2006.01)

(52) U.S. Cl.
USPC .......... 425/333; 425/332

(58) Field of Classification Search
USPC .......... 264/332, 333
See application file for complete search history.

(56) References Cited

U.S. PATENT DOCUMENTS

| | | | | | |
|---|---|---|---|---|---|
| 1,152,348 | A | * | 8/1915 | Streich | 425/230 |
| 2,560,864 | A | * | 7/1951 | Hettinger | 425/333 |
| 2,760,397 | A | * | 8/1956 | Arpin | 82/132 |
| 3,899,275 | A | | 8/1975 | Atwood | |
| 3,988,114 | A | * | 10/1976 | Gorin et al. | 23/313 R |
| 4,668,174 | A | * | 5/1987 | Williams | 425/145 |
| 4,793,789 | A | | 12/1988 | Müller | |
| 5,007,820 | A | * | 4/1991 | Schwab et al. | 425/333 |
| 5,264,232 | A | * | 11/1993 | Campbell | 426/503 |
| 5,714,178 | A | * | 2/1998 | Keener | 425/333 |
| 6,123,537 | A | * | 9/2000 | Cummins et al. | 425/332 |
| 6,733,268 | B2 | * | 5/2004 | Oki et al. | 425/192 R |
| 2011/0212208 | A1 | | 9/2011 | Voyatzakis et al. | |

OTHER PUBLICATIONS

Occupational Safety & Health Administration (OSHA) standard No. 1910.217—Mechanical Power Presses, Jul. 1979.

* cited by examiner

*Primary Examiner* — Joseph S Del Sole
*Assistant Examiner* — Nahida Sultana
(74) *Attorney, Agent, or Firm* — Altman & Martin; Steven K Martin

(57) ABSTRACT

A dough rounder with a base, motor, drum, and auger. The auger is mounted to the base and the drum is mounted to rotate about the auger. The auger has a hollow cylinder and a spiral ramp fixed to the outer surface of the cylinder. The upper surface of the ramp is textured for gripping the dough. In one embodiment, the ramp upper surface is textured by a plurality of spurs.

8 Claims, 3 Drawing Sheets

DOUGH ROUNDER WITH TEXTURED AUGER

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to dough preparation, more particularly, to machines for rolling dough into balls.

2. Description of the Related Art

Rounding is an important step in the baking process. One type of dough rounder is described in U.S. Pat. No. 3,899,275 and U.S. Patent application publication No. 2011-0212208, hereby incorporated by reference in their entirety. As shown in FIGS. 1-3, the dough rounder 10 has an auger 20 that consists of a spiral ramp 24 rigidly secured to the outer wall 36 of a tubular cylinder 22 and that is mounted to a base 12. A cylindrical drum 18 is mounted to rotate about the auger 20 such that the outer edges 26 of the ramp 24 are contiguous to the inner wall 28 of the drum 18. The ramp 24 is inclined downwardly and outwardly across its width to push lumps of dough 2 on the ramp 24 against the inner wall 28 of the drum 18. A dispenser plate 30 at the bottom of the cylinder 22 directs lumps of dough 2 dropped into a top opening 32 of the cylinder through a side opening 34 in the side wall 36 of the cylinder 22 and on to the ramp upper surface 38. The drum 18 is rotated, either directly or indirectly, by a motor 14. Rotation of the drum 18 moves the dough 2 upwardly on the ramp upper surface 38 to the upper edge of the cylinder 22 and drum 18. Constant pressure of the drum wall 28 and the ramp upper surface 28 on the dough 2 rounds it as it moves to the top of the drum 18. The ramp 24 ends at the upper edge of the drum 18 and when the dough ball 2 reaches the top of the drum 18, it drops over the edge of the drum 18 onto a suitable surface.

One shortcoming of the current auger design is that the upper surface of the auger is smooth. In the appropriate circumstances, such as if the outer surface of the dough is dried out and crusty, there is no resistance to the rotating action. The dough is just pushed upward the ramp without much of the molding action. This creates a very loose, non-uniform dough ball with air inside.

BRIEF SUMMARY OF THE INVENTION

The basic dough rounder of the present invention has a base, a drum, an auger, and a mechanism for rotating the drum. The auger has a ramp with a textured upper surface that provides resistance to the movement of the dough up the ramp. One way to texture the upper surface is to provide a surface much like sandpaper. Another way is with radial grooves.

Another way to texture the ramp upper surface is by cone-shaped spurs. The width of the spur base is in the range of from approximately 25 mils to approximately 100 mils, preferably about 50 mils. The height of the spur is in the range of from approximately 25 mils to approximately 100 mils and is preferably about 50 mils. The present invention contemplates that the spur may have different shapes, such as cylindrical or a cone with parabolic sides.

The spurs are arranged in a regular pattern, typically in a generally diamond pattern. Any other pattern that is appropriate for a particular application is contemplated.

The spurs must be close enough that the dough will be gripped by enough spurs to provide an adequate braking action. The spacing is in the range of from approximately ⅛ inch to approximately 1 inch, with a preferred spacing of approximately ¼ inch.

BRIEF DESCRIPTION OF THE DRAWINGS

For a fuller understanding of the nature and object of the present invention, reference is made to the accompanying drawings, wherein.

DETAILED DESCRIPTION OF THE INVENTION

Figure 1:
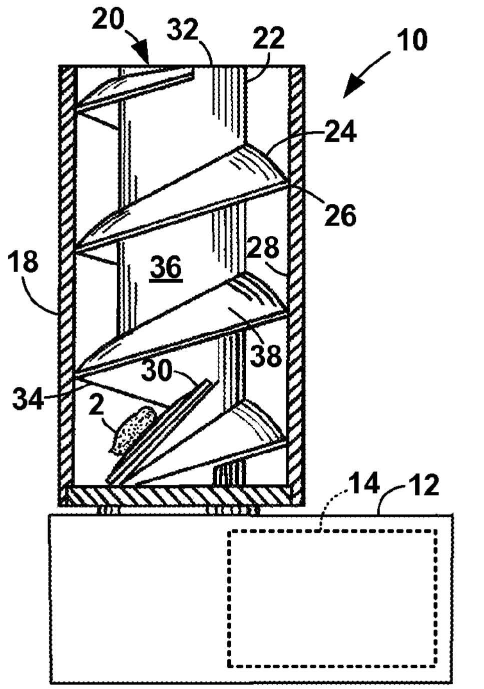
FIG. 1 Prior Art
FIG. 1 is a cross-section of a prior art dough rounder showing the dough being dispensed onto the auger ramp upper surface.
Figure 2:
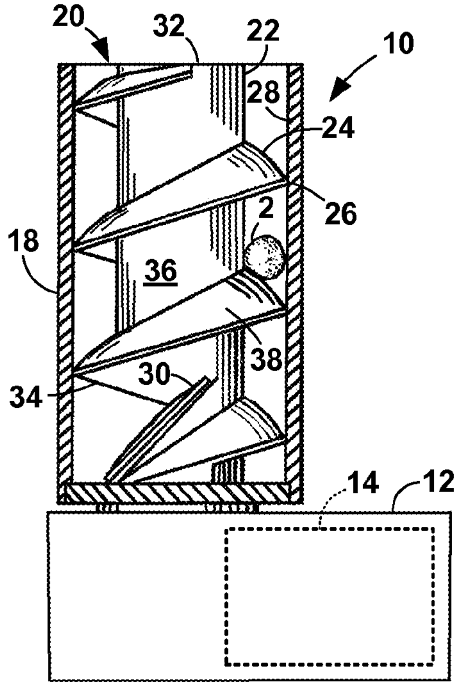
FIG. 2 Prior Art
FIG. 2 is a cross-section of a prior art dough rounder showing the dough part way up the drum.
Figure 3:
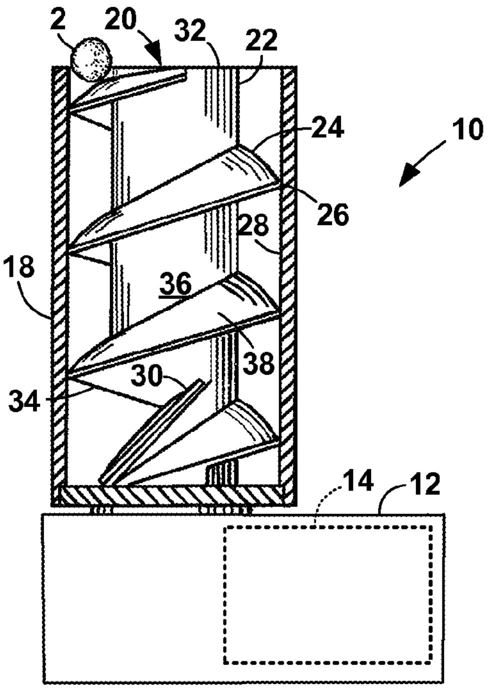
FIG. 3 Prior Art
FIG. 3 is a cross-section of a prior art dough rounder showing the dough ball at the top of the drum just before dropping.

The basic dough rounder 10 of the present invention has a base 12, a drum 18, an auger 20, and a mechanism 14 for rotating the drum 18. The auger 20 has a spiral ramp 24 rigidly secured to the outer wall 36 of a tubular cylinder 22 and is mounted to the base 12. The drum 18 is mounted to be rotated about the auger by the rotating mechanism 14. Typically, the rotating mechanism 14 is a motor, but can be any device that is capably of rotating the drum 18.

Augers 20 of the prior art have spiral ramps 24 with relatively smooth upper surfaces 38, causing the problems described above. The auger 20 of the present invention has a ramp 24 with a textured upper surface 38. The textured surface 38 provides resistance to the movement of the dough 2 up the ramp 24 by producing a braking action on the motion of the dough 2.

The result of the braking action is that more force must be exerted on the dough 2 in order for it to move up the ramp 24. With one side of the dough 2 being held back by the textured surface 38, another side of the dough 2 being pushed up the ramp by the drum 18, and the action of the curved ramp 24 pushing the dough 2 against the drum 18, a circular molding action is imparted on the dough 2. This molding action causes the dough 2 to rotate about an axis that runs roughly from the ramp edge 26/drum inner wall 28 interface, upwardly and inwardly toward the auger cylinder 22. The molding action forces the dough 2 to become more tightly compacted around its axis. This creates a tight molded dough ball with almost no air inside.

The present invention contemplates a number of different ways to texture the ramp upper surface 38. Typically, although not necessarily, the entirety of the ramp upper surface 38, from the cylinder 22 to the outer edge 26 and from the bottom of the ramp 24 at the side opening 34 to the top of the ramp at the top opening 32, will be textured.

Figure 4:
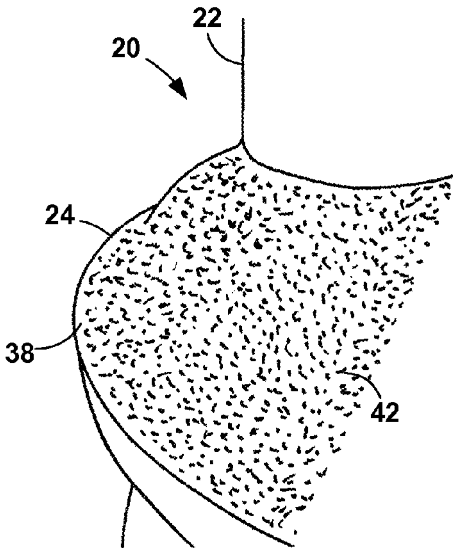
FIG. 4 is a detail of one method of texturing the ramp upper surface.
Figure 5:
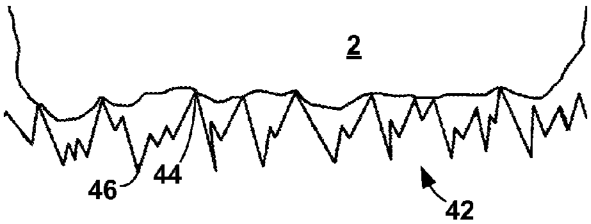
FIG. 5 is a magnified cross-section of the ramp upper surface of FIG. 4.

One way to texture the ramp upper surface 38 is to provide a surface much like sandpaper, as at 42 in FIG. 4. The texturing must be coarse enough so that the peaks 44 are far enough apart to grip the dough. The dough 2 must be able to sink into the valleys 46, as in FIG. 5, so that the peaks 44 can grip the dough 2. If the peaks 44 are too close together, they merely act like a smooth surface because the dough 2 cannot sink into the valleys 46.

Figure 6:
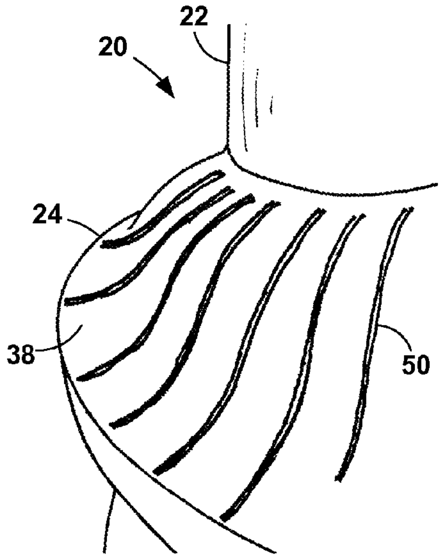
FIG. 6 is a detail of a method of texturing the ramp upper surface with radial grooves.
Figure 7:
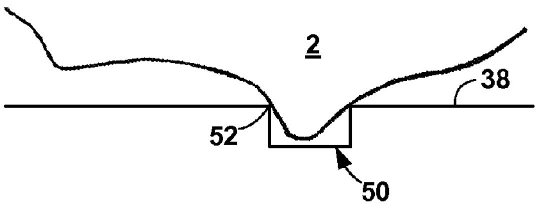
FIG. 7 is a cross-section of a radial groove.

Another way to texture the ramp upper surface is with radial grooves 50, as in FIG. 6. The leading edges 52 of the grooves 50 are relatively sharp in order to grip the dough 2. The grooves 50 must wide enough that the dough can sink into the grooves, as in FIG. 7, otherwise the edges 52 cannot grip the dough 2. The grooves 50 must be close enough that the dough 2 will be gripped by at least one groove 50 at all times. Preferably, several grooves 50 grip the dough 2 at the same time to provide a better braking action. The spacing between the grooves 50 are at the ramp outer edge 26 is in the range of from ⅛ inch to 1 inch, with a preferred spacing of about ¼ inch.

The main problem with the above methods and other methods where there are small or narrow depressions in the ramp surface is sanitation. Small and narrow depressions are difficult to clean thoroughly because flecks of dough caught in the depressions are difficult to remove. Thus, in order to avoid sanitation issues, much time must be spent in cleaning.

Figure 8:
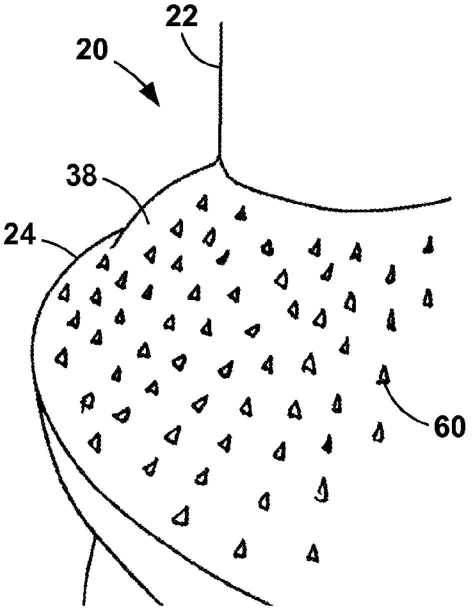
FIG. 8 is a detail of a method of texturing the ramp upper surface with spurs.
Figure 9:
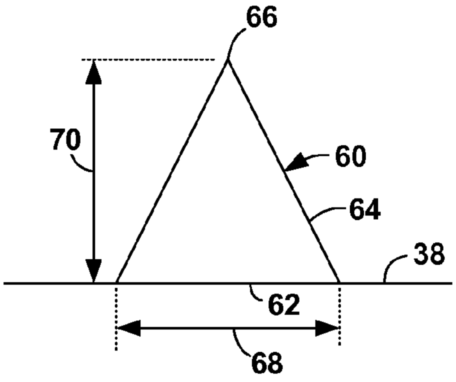
FIG. 9 is a cross-section of a spur.

Another way to texture the ramp upper surface 38 is the use of spurs 60 extending from the ramp upper surface 38, as shown in FIG. 8. FIG. 9 shows a cross section of a preferred spur 60. The spur 60 is a cone with a base 62 at the ramp upper surface 38 and a side 64 that extends up to a top 66. The width 68 of the spur base 62 is in the range of from approximately 25 mils (0.025 inch) to approximately 100 mils, preferably about 50 mils. The height 70 of the spur 60 from the ramp upper surface 38 to the spur top 66 is in the range of from approximately 25 mils to approximately 100 mils and is preferably about 50 mils. Although the side 64 is shown in FIG. 9 as straight, it may curve concavely or convexly in any particular application.

The present invention contemplates that the spur 60 may have different shapes, such as cylindrical or a cone with parabolic sides. The limitation on the shape is that it must be able to provide a grip on the dough 2. For example, if the spur 60 is a cylinder, the diameter of the cylinder should be small enough so that it can pierce the dough 2 in order to grip it.

Figure 10:
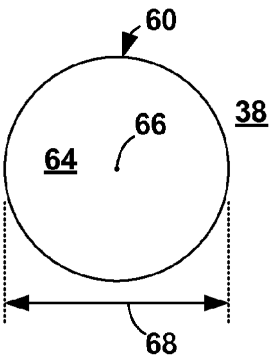
FIG. 10 is a top view of a spur.

In the present configuration, the base of the spur 60 is circular, as in FIG. 10. However, other shapes may be used. For example, the spur 60 can be oval, with the larger dimension along the direction that the dough 2 travels.

Figure 11:
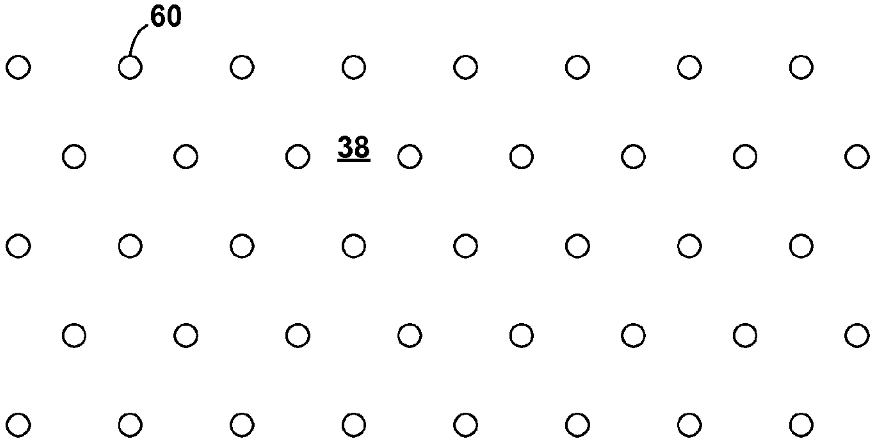
FIG. 11 is a detail view of one arrangement of the spurs on the ramp upper surface.

In the present configuration, the spurs 60 are arranged on the ramp upper surface 38 in a regular patent, typically a generally diamond pattern, as in FIG. 11. Because of the curvature of the ramp upper surface 38, the pattern will not necessarily consist of straight lines of spurs 60, but will curve with the upper surface 38. Any other pattern that is appropriate for a particular application is contemplated by the present invention including, but not limited to, square, rectangular, hexagonal, etc.

As with the grooves 50 described above, the spurs 60 must be close enough that the dough 2 will be gripped by enough spurs 60 at one time to provide an adequate braking action. The spacing between the spurs 60 is in the range of from approximately ⅛ inch to approximately 1 inch, with a preferred spacing of approximately ¼ inch.

The auger 20 is typically composed of a cast aluminum alloy or molded plastic. The spurs 60 are incorporated into the cast or mold.

Recall that the sanitation problem described above is caused by small and narrow depressions. The use of spurs 60 eliminates depressions, thereby simplifying the cleaning process and greatly reducing the sanitation problems.

Thus it has been shown and described a dough rounder with a spurred auger. Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A dough rounder comprising:

(a) a base;

(b) a drum with an inner surface, said drum rotatably mounted vertically to said base;

(c) a mechanism for rotating said drum;

(d) an auger comprised of (1) a tubular cylinder with an open top end, a bottom end, a side wall with an outer surface, a side opening in said side wall adjacent said bottom end, and a deflector plate at said bottom end facing said side opening, and (2) a spiral ramp rigidly secured to said cylinder outer surface and having an outer edge and an upper surface, said auger being positioned within said drum with said ramp outer edge abutting said drum inner surface; and (e) said ramp upper surface being textured by a plurality of spurs with a side extending from said auger upper surface to a top, said spurs having a width at the ramp upper surface in the range of from 25 mils to 100 mils and a height from said ramp upper surface to said top in the range of from 25 mils to 100 mils.

2. The dough rounder of claim 1 wherein said spurs are arranged in a grid with a spacing in the range of from ⅛ inch to 1 inch.

3. The dough rounder of claim 2 wherein said spur width is approximately 50 mils, said spur height is approximately 50 mils, and said grid spacing is approximately ¼ inch.

4. The dough rounder of claim 1 wherein said spurs are cone-shaped.

5. The dough rounder of claim 2 wherein said grid is a generally diamond pattern.

6. A dough rounder comprising:

(a) a base;

(b) a drum with an inner surface, said drum rotatably mounted vertically to said base;

(c) a mechanism for rotating said drum;

(d) an auger comprised of (1) a tubular cylinder with an open top end, a bottom end, a side wall with an outer surface, a side opening in said side wall adjacent said bottom end, and a deflector plate at said bottom end facing said side opening, and (2) a spiral ramp rigidly secured to said cylinder outer surface and having an outer edge and an upper surface, said auger being positioned within said drum with said ramp outer edge abutting said drum inner surface; and (e) said ramp upper surface having a plurality of spurs with a side extending from said auger upper surface to a top, said spurs having a width at the ramp upper surface of approximately 50 mils and a height from said ramp upper surface to said top of approximately 50 mils, said spurs being arranged in a grid with a spacing in the range of from ⅛ inch to 1 inch.

7. The dough rounder of claim 6 wherein said spurs are cone-shaped.

8. The dough rounder of claim 6 wherein said grid is a generally diamond pattern.

* * * * *